United States Patent
Li et al.

(10) Patent No.: US 11,500,604 B2
(45) Date of Patent: Nov. 15, 2022

(54) PRESENTING A DOCUMENT ON A COMPUTER

(75) Inventors: Hong Li, Beijing (CN); Lei Ren, Beijing (CN); Yun Sheng Wang, Beijing (CN); Jun Wei Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 574 days.

(21) Appl. No.: 13/535,919

(22) Filed: Jun. 28, 2012

(65) Prior Publication Data

US 2013/0007608 A1    Jan. 3, 2013

(30) Foreign Application Priority Data

Jun. 30, 2011    (CN) .......................... 201110181384.8

(51) Int. Cl.
  *G06F 3/14*    (2006.01)
  *G06F 9/451*    (2018.01)
(52) U.S. Cl.
  CPC ............ *G06F 3/1454* (2013.01); *G06F 9/454* (2018.02); *G09G 2340/14* (2013.01); *G09G 2354/00* (2013.01); *G09G 2360/04* (2013.01)
(58) Field of Classification Search
  CPC ... G06F 3/1454; G06F 9/454; G09G 2340/14; G09G 2354/00; G09G 2360/04
  See application file for complete search history.

(56) References Cited

U.S. PATENT DOCUMENTS

| | | | |
|---|---|---|---|
| 6,370,498 B1 | 4/2002 | Flores et al. | |
| 6,558,049 B1 | 5/2003 | Shin | |
| 7,016,977 B1 | 3/2006 | Dunsmoir et al. | |
| 7,398,214 B2 | 7/2008 | Boegelund et al. | |
| 7,716,038 B2 | 5/2010 | Flanagan et al. | |
| 7,818,282 B2 | 10/2010 | Blackwell et al. | |
| 7,856,352 B2 | 12/2010 | Godoy et al. | |
| 7,904,290 B2 | 3/2011 | Wells | |
| 7,925,495 B2 | 4/2011 | Hecht et al. | |
| 2002/0143523 A1* | 10/2002 | Balaji ................. | G06F 17/2205 704/8 |

(Continued)

FOREIGN PATENT DOCUMENTS

| | | |
|---|---|---|
| CN | 1363061 A | 8/2002 |
| CN | 1474312 A | 2/2004 |

(Continued)

OTHER PUBLICATIONS

CN Patent Application 201110181384.8, Office Action, dated Sep. 11, 2014, 41 pg.

*Primary Examiner* — Keith D Bloomquist
(74) *Attorney, Agent, or Firm* — Cuenot, Forsythe & Kim, LLC

(57) ABSTRACT

A document can be presented on a computer that includes at least two video output ports. The document is divided into multiple parts, with each part being expressed in a different language. Each one of the at least two video output ports can be configured in or for a language of a partial document to be output by the video output port. Each one of the at least two video output ports can be made to synchronously output the partial document to which the language configured for the video output port corresponds.

15 Claims, 3 Drawing Sheets

(56) References Cited

U.S. PATENT DOCUMENTS

| | | |
|---|---|---|
| 2002/0190919 A1 | 12/2002 | Lee |
| 2003/0133041 A1* | 7/2003 | Curtis et al. ................. 348/462 |
| 2004/0044518 A1 | 3/2004 | Reed et al. |
| 2005/0022113 A1* | 1/2005 | Hanlon ............... G06F 17/3002 715/229 |
| 2005/0248790 A1* | 11/2005 | Ornstein ............. G06F 17/2229 358/1.12 |
| 2006/0129984 A1* | 6/2006 | Chen ........................... 717/120 |
| 2007/0168872 A1* | 7/2007 | Almonte ................ G06F 9/451 715/761 |
| 2007/0288853 A1* | 12/2007 | Neil ........................ G06F 9/454 715/760 |
| 2008/0288242 A1 | 11/2008 | Potter |
| 2009/0132232 A1 | 5/2009 | Trefler |
| 2010/0077314 A1 | 3/2010 | Hushyar et al. |
| 2011/0016195 A1 | 1/2011 | Kaplan et al. |
| 2012/0078609 A1* | 3/2012 | Chaturvedi ............ G06F 40/40 704/3 |

FOREIGN PATENT DOCUMENTS

| | | |
|---|---|---|
| CN | 101106469 A | 1/2008 |
| CN | 102855107 A | 1/2013 |

\* cited by examiner

PRESENTING A DOCUMENT ON A COMPUTER

CROSS-REFERENCE TO RELATED APPLICATIONS

This application claims the benefit of China Application Number 201110181384.8 filed on Jun. 30, 2011, which is fully incorporated herein by reference.

BACKGROUND

Computer presentation systems are the most common software system currently. Computer operators can output the contents on a screen to a display device like a projector via a video output port by using a projector button in a standard keyboard. This is the most basic function of a presentation system. A further function of a presentation system, e.g., the Lotus Symphony® product of IBM® Corporation or the PowerPoint® product of Microsoft® Corporation, can output a presentation document in full screen through a video output port, such that the speaker can express his/her views more easily using the presentation system.

In a current computer presentation system, the video output of the computer is generated by a display card, which includes a video output port thereon. During the presentation process, the video output port of the computer sends the display information received from the host to a display device connected to the other end of its signal line, which the display device can be a display (CRT, LCD), or a projector, or a television set, etc.; the video output port outputs a video signal, which is displayed on the display device, so that the presentation effect is achieved.

Sometimes, for certain requirements, a computer may include multiple video output ports (realized by using multiple display cards or a single display card supporting MultiView), which are connected with multiple display devices, or the output of a computer on the same one display device can be divided into two or more outputs, or multiple display cards in a computer network are connected with multiple display devices, and are controlled by a computer in the network to present. Currently, common output manners are as follows:

1. Clone mode—multiple display devices display the same contents, e.g., in a big conference, multiple projectors output multiple projections;

2. Extension mode—multiple display devices jointly form a bigger content, e.g., in a extended desktop mode, in which case a display card supporting MultiView or multiple display cards are required;

3. Multi-mode—multiple display devices use different display modes (resolution, refresh frequency, color, etc.) independently to display different contents, in which case, a display card supporting MultiView or multiple display cards are also required. The multiple display cards may be in one computer, or in a plurality of computers forming a network.

A current display card may have 3 video output ports or 6 video output ports, for example, using a mini displayport. For example, by using the display controller in http://www.pcpop.com/doc/0/625/625517_2.shtml and the ATI Eyefinity technology, when connected with multiple displays, a single card may have up to six displays with different specifications arranged as required, and four cards in parallel may support up to 24 displays to form a broad display wall. Therefore, the computer internal hardware devices for displaying different contents on multiple displays are already available.

However, if the document to be presented is multilingual, and the languages understood by the target viewers are different, for example, some viewers desire that the document they view is in English, some desire it in Chinese, and some desire it in Japanese, in current solutions, one manner is that each page of the document includes contents described in three languages, each viewer can see the three languages, and select the language to view by himself. Although this manner is simple, it is difficult to arrange each page of the document reasonably, the contents are difficult to be coherent, causing poor user experience to the viewers.

Another manner is to use the above extension mode or multi-mode. Each document uses multiple files, with each file described in one language, and the multiple files are presented at the same time. This manner is inconvenient for the speaker to use, since each time a page is switched, multiple people need to operate the presentation at the same time, or one person needs to perform multiple switch operations for multiple presentations. Especially for a presentation with animation effects, it is very different to synchronize, and also causes a poor user experience.

The same problems also appears in a multilingual audio document or multimedia play, for example, the audio document or the multimedia document includes contents in several languages, and it is needed to project documents in different languages on different projection devices; even, when any type of documents including multiple languages need to be synchronously presented on multiple devices, there will be the problems similar to those of a speech text.

BRIEF SUMMARY

One embodiment includes a method of presenting a document on a computer. The computer can include at least two video output ports and the document can be divided into multiple parts with each part expressed in a different language. The method can include configuring, for each one of the at least two video output ports, a language of a part of the document to be output by the video output port and making each one of the at least two video output ports synchronously output the part of the document to which the language configured for the video output port corresponds.

Another embodiment includes a system for presenting a document. The document can be divided into multiple parts with each part expressed in a different language. The system can include a processor configured to initiate executable operations. The executable operations can include configuring, for each one of at least two video output ports of the system, a language of a part of a document to be output by the video output port and making each one of the at least two video output ports synchronously output the part of the document to which the language configured for the video output port corresponds.

Another embodiment includes a computer program product for presenting a document on a computer that includes at least two video output ports. The document is divided into multiple parts with each part being expressed in a different language. The computer program product can include a computer readable storage medium having stored thereon program code that, when executed, configures a processor to perform executable operations. The executable operations can include configuring, for each one of at least two video output ports of the system, a language of a partial document to be output by the video output port and making each one of the at least two video output ports synchronously output the partial document to which the language configured for the video output port corresponds.

BRIEF DESCRIPTION OF THE SEVERAL VIEWS OF THE DRAWINGS

The above and other objectives, features and advantages of the embodiments of the present invention will become more apparent by referring to a more detailed description of exemplary implementations of the present invention in the accompanying drawings, in which the same reference numerals usually denote the same components in the exemplary implementations of the present invention.

DETAILED DESCRIPTION

One or more embodiments of the present invention generally relate to computer software applications, and more particularly, to a method, system, and apparatus for presenting a document on a computer. The computer can include at least two video output ports. The computer can synchronously output documents in different languages on different video output ports. The documents can be in different languages on different display devices that can be operated and presented synchronously.

Preferred implementations of the present invention will be described in greater detail by referring to the accompanying drawings, in which preferred embodiments of the present invention are shown. However, the embodiments of the present invention may be realized in various forms, and should not be construed as being limited by the particular embodiments set forth herein. In contrast, these embodiments are provided only so as to make the present invention more thorough and complete, and to completely convey the scope of the present invention to those skilled in the art.

The following illustrations will take speech text as an example to explain the organization of a document, and those skilled in the art will know that other types of files, e.g., text files, audio files, video files, multimedia files, etc., can be organized in the similar way.

Figure 1:
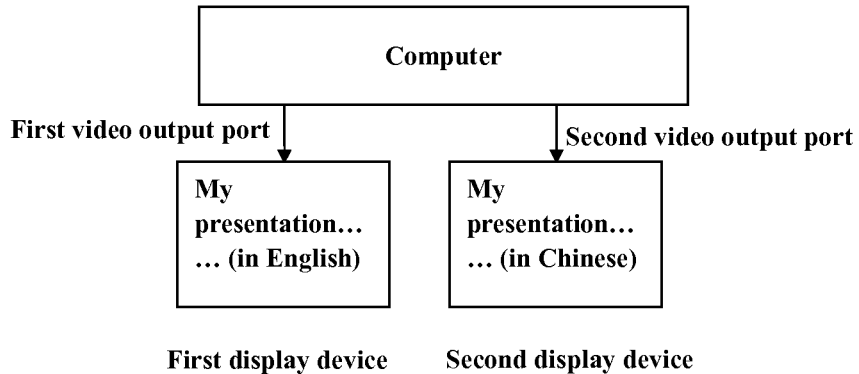
FIG. 1 shows a desired visual presentation effect by taking a document including Chinese and English as an example.

FIG. 1 shows a desired visual presentation effect by taking a document including Chinese and English as an example. As shown, the computer is connected with a first display device via a first video output port, and connected with a second display device via a second video output port; the first display device displays the document in Chinese, while the second display device displays the document in English. When the speaker changes pages or performs animation presentation, similar to a current projection system, a page button is pressed, and the Chinese of the first display device and the English of the second display device change pages synchronously, so are animation operations. If the document includes more languages and use more display devices, with each display device presenting the document in different languages, this as a whole is equivalent to an extension of the above two languages.

When a multilingual document is to be presented on a computer, for the convenience of the speaker, the document needs to be divided into multiple parts, each part is expressed in a different language to express substantially the same contents, and the document can be stored in the form of a file. Since different partial documents will be sent to different projection devices to be presented, the document needs to include all the languages used by the document, so that the document using a required language is sent to a proper projection device. The document may be stored using the same one file, or stored using multiple files.

In an implementation of using one file to store the document, a structuralized file may be used to store the document, e.g., in the XML format. The XML format has very flexible and sound expandability, and at the same XML documents conform to common specifications. Thus, any presentation system implementing embodiments of the present invention can perform multilingual presentation to achieve the required technical effects. If the XML language is used to express, it is easy to separate the partial documents to which different languages correspond. In the following, an example of using the XML language to express a presentation document is given. Those skilled in the art will know that this format is only exemplary, and any suitable format can be used specifically to divide a multilingual document consisting of multiple parts expressing the same contents.

In the following example, the document contents of all the languages are described in one XML file, and the application layer interface of the presentation system can obtain all the languages used in the document by obtaining all the ids, and query respectively the contents of the document to be accessed, to which each language corresponds, through each id, and then look up the partial document to which the language corresponds via the designated language identification.

```
<title name= "TEXT001">
</title>
...
<text id="TEXT001" default="zh_CN">
   <lang local="en_US">Multilingual Presentation System</lang>
   <lang local="zh_CN">多语言演示系统</lang>
</text>
```

For example, the above title is the index that the actual document sends to the video output ports, and in the following are the document contents described using different languages. If the application of the presentation system is to output the document to a video output port which is set to output Chinese, it needs to invoke getText("TEXT001", "zh-CN") to get the Chinese character string "多语言演示系统" according to the id and language type, to replace the above title index, and then sends the document to the display device, so as to correctly display "多语言演示系统". For the same reason, if it is to output document to another video output port which is set to output English, it needs to invoke getText("TEXT001", "en_US") according to the id and language type to get the English character string "Multilingual Presentation System", to replace the above title index, and then sends the document to the display device, so as to correctly display "Multilingual Presentation System".

In another implementation of using one file to store the document, an extension form of the file itself, such as multiple files linked together, may be used to store the document. In an implementation, for speech text, a text format, the text format of the Microsoft Office suite, a presentation format, or even any existing suitable formats may be used to store the document, including its contents and information such as the display effects, and separators may be used between parts to which different languages correspond, or fixed-length records may be used to separate partial documents to which different languages correspond, or a manner such as index pointer may be used to separate partial documents to which different languages correspond. In addition, since speech text is usually presented page by page, the speech text can also be separated in two ways: page and language. For example, the way of [language 1, page 1] [language 2, page 1] [language 3, page 1] . . . [language m, page 1] . . . [language 1, page n] [language 2, page n] [language 3, page n] . . . [language m, page n], or the way of [language 1, page 1] [language 1, page 2] . . . [language 1, page n] . . . [language m, page 1] [language m, page 2] . . . [language m, page n], can both separate the parts in different languages of the document. Here a page may be viewed as a unit document of the speech text, that is, a part in a number of parts. For other forms of file, such as a video file, its unit document may be a frame of video document; and for a different form of file, a different unit document may be used.

There are also various implementations of using many files to store a document. In one implementation, a single master file and multiple dependent files may be used to store a document. In the single master file are defined the document contents to be displayed, such as all the languages used in the document, as well as the names of the dependent files to which the languages correspond, etc. Then a dependent file is created for each language, in which dependent file is defined the partial document to which the each language in the master file corresponds. The dependent file may use a file format used by various existing presentation systems to make the implementation more easy and convenient. When a language is to be displayed, it is only needed to load the master file and the file of the specified language.

In another implementation of using multiple files to store a document, multiple files may be used directly, with the file name of each file including a same part and a different part, the same part for identifying that the document is a multilingual document, while the different part for indicating the language used by the corresponding partial document. All the languages used by the document can be obtained through a programming interface. In still another implementation, a single control file and a file of one language may be used, and files of other languages may be obtained by online translation. The translation quality in such a manner is related to the translation quality of the online translation software.

The user interface of the presentation system may support the creation and editing of a multilingual document of the multilingual format it uses, and the presentation system may store the multilingual document according to the manner it supports.

Figure 2:
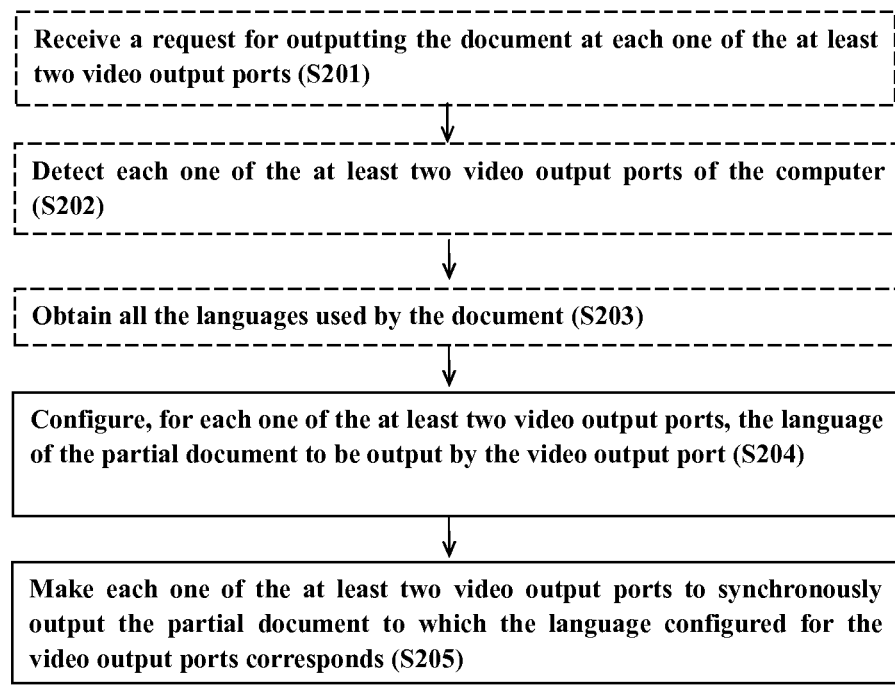
FIG. 2 shows the steps of a method for presenting a multilingual document on a computer.

In the case that a multilingual document has been stored in a computer, the present invention discloses a method for presenting a multilingual document on a computer. Here, the computer needs to include at least two video output ports, which may be at least two video output ports included in multiple display cards, or at least two video output ports supported by a single display card. The multilingual document is divided into multiple parts, each part using a different language to express, and the multilingual document may use any file formats discussed above. FIG. 2 shows the steps of the method. As shown in FIG. 2, at step S204, configuring, for each one of the at least two video output ports, a language of a partial document to be output by the video output port; at step S205, making each one of the at least two video output ports to synchronously output the partial document to which the language configured for the video output port corresponds. Preferably, the method further comprises step S201, receiving a request for outputting a document at each one of the at least two video output ports; and step S202, detecting each one of the at least two video output ports of the computer. In another implementation, the method further comprises step S203, obtaining all the languages used by the document. For step S201, the request for outputting a document at each one of the at least two video output ports may be received from a user, and the reception may be through wire or wireless transmission, including but not limited to, network, wireless network, infrared, USB, radio frequency, laser, etc. The simplest manner is through the user inputting a presentation command on the keyboard. In some cases, the computer corresponds to a fixed display, e.g., fixed multilingual presentation services provided at air ports, bus stations, banks, etc. In such a cyclic presentation there may not be the step of receiving the user request. Therefore, the step is not necessary. For steps S202 and S203, since the user may be very familiar with the video output ports included in or coupled to the computer or the languages used by the document, the configuration at step S204 may be made directly, without step S202 to detect each one of the at least two video output ports included in the computer and step S203 to obtain all the languages used by the document, and thus these two steps are not necessary either. In addition, at step S204, a user interface may be provided for displaying each one of the at least two video output parts included in the computer as detected in step S202 and all the languages used by the document as obtained at step S203. The user may configure via wires, inputs, etc., and store the configuration information. With regard to detecting each one of the at least two video output ports included in the computer, generally computers provide such an interface, which may be used to detect directly. As for obtaining all the languages used by the document, for documents of different formats, the obtaining manners may be different; and some manners of obtaining all the languages used by documents of different formats have been described above, and are not repeated here.

Figure 3:
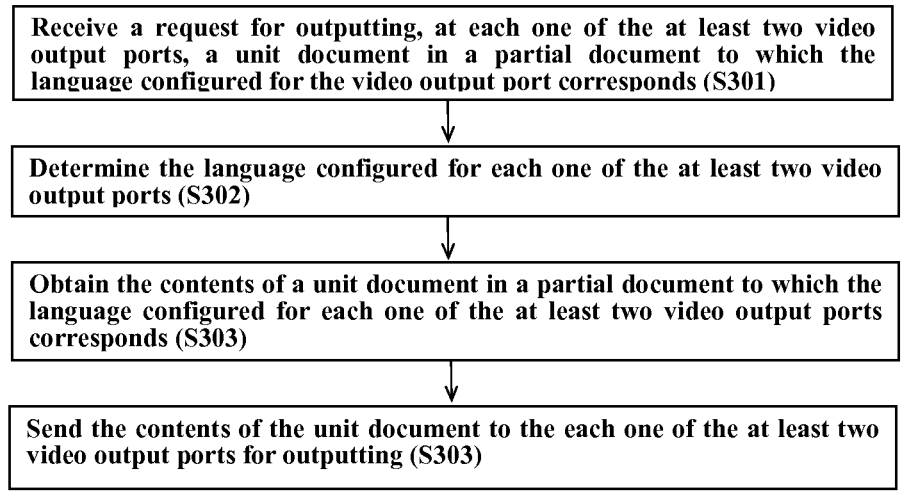
FIG. 3 shows implementing steps of step S205.

There are many specific implementations of step S205. FIG. 3 shows method steps of an implementation of step S205. In this implementation, since usually a document is presented one unit document by one unit document, first at step S301, receiving a request for outputting, at each one of the at least two video output ports, a unit document in a partial document to which the language configured for the video output port corresponds; at step S302, determining the language configured for each one of the at least two video output ports; at step S303, obtaining the contents of a unit document in a partial document to which the language configured for each one of the at least two video output ports corresponds; at step S304, sending the contents of the unit document to the each one of the at least two video output ports for outputting. Thus presenting a unit document for the first time is accomplished. During the process of presenting the next unit document, the step of determining the language configured for each one of the at least two video output ports may be omitted. The implementation of the above FIG. 3 may also realize the embodiments of the present invention with some variations. For example, steps S302, S303 and S304 may be respectively replaced by: obtaining the contents of the unit document to which all the languages correspond in the partial document; determining a language configured for each one of the at least two video output documents; and sending the contents to which the language configured for each one of the at least two video output ports corresponds, in the contents of the unit document to which all the languages correspond in the partial document, to the each one of the at least two video output ports for outputting. The advantage of the two implementations is that, all the processing is performed at the processor end of the computer, without need to change the display card or the display device. A current display card and display device can be used directly, if only the application of the presentation system in the computer is modified.

Figure 4:
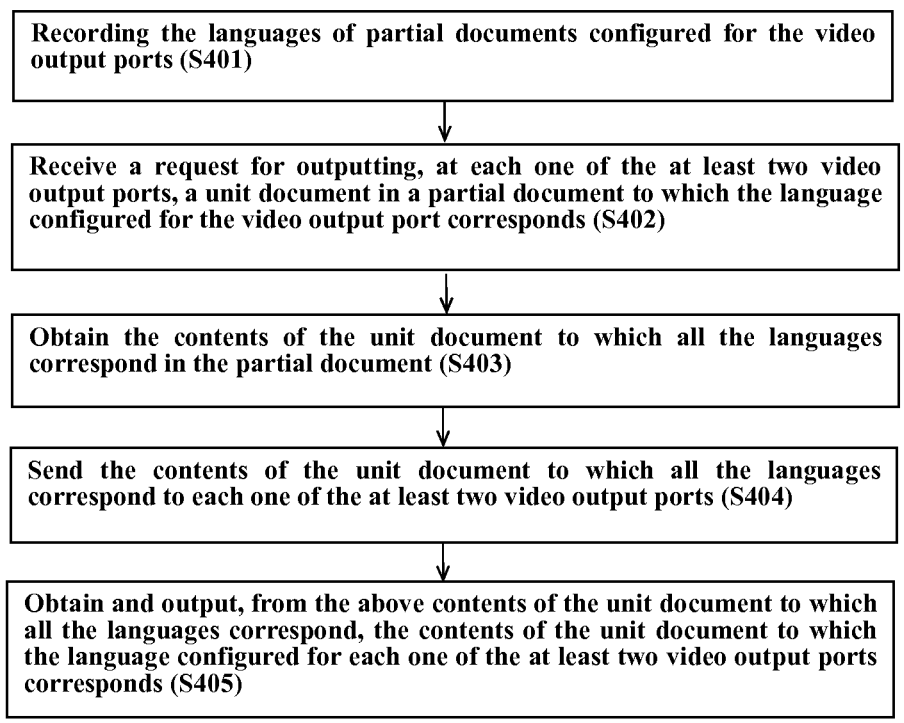
FIG. 4 shows a flow of an improved implementation.

In still another implementation of step S205, a current display card needs to be improved, for example, added with an embedded processor and memory, which memory may be configured to store the language of a partial document configured for the video output port thereon. FIG. 4 shows a flow of the improved implementation. As shown in FIG. 4, when step S204 of configuring, for each one of the at least two video output ports, the language of a partial document to be output by the video output port, is completed, at step S401, communicating in succession with each video output port, and during the communication with each video output port, recording the language of the partial document configured for the video output port, such as recording in the embedded processor or memory of the display card; then the output step can be expanded as the following multiple steps, that is, at step S402, receiving a request for outputting, at each one of the at least two video output ports, a unit document in the partial document to which the language configured for the video output port corresponds; at step S403, obtaining the contents of a unit document to which all the languages correspond in the partial document; at step S404, sending the contents of the unit document to which all the languages correspond to each one of the at least two video output ports; at step S405, according to the recorded language of a partial document configured for each one of the at least two video output ports, obtaining and outputting the contents of the unit document to which the language configured for each one of the at least two video output ports corresponds from the contents of the unit document to which all the languages correspond.

Alternative steps of step S404 through step 405 may be: first sending the contents of the unit document to which all the languages correspond to each one of the at least two video output ports, wherein during the sending process, the sent data is divided into multiple data units, and each specific data unit include contents of the unit document to which the specific language corresponds in the partial document; and then the display card, according to the recorded language of the partial document configured for each one of the at least two video output ports, receiving and outputting the specific data unit. For example, for a multilingual document including three languages, in which the data units that can be divided exactly by 3 include a first language document; the data units that can be divided by 3 with a remainder of 1 include a second language document; and the data unit that can be divided by 3 with a remained of 2 includes a third second language document. The display card can obtain the data units that need to be output by the corresponding video output port according to the recorded language, so as to output it. Regardless, some steps of both the implementations need to be processed by the embedded processor on the display card, and thus the cost for implementation is great. The embedded processor can be realized by adding an additional chip on a current display card, or by adding an additional system.

The above-described computer can be a standalone computer, or multiple networked computers, or multiple networked computers with one computer performing the operations, and other computers installed with display cards and connected with the display devices via video output ports.

Figure 5:
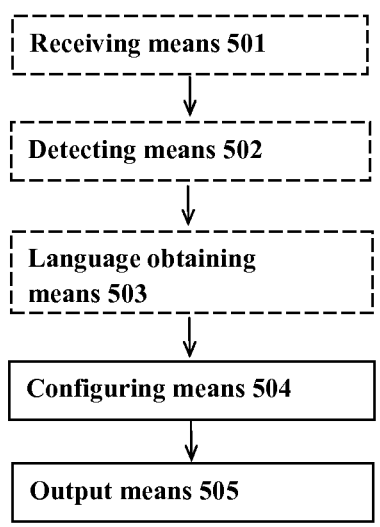
FIG. 5 shows a structural diagram of a system for presenting a document on a computer.

Under the same inventive concept, the one or more embodiments of the present invention further disclose a system for presenting a document on a computer. As shown in FIG. 5, the computer includes at least two video output ports, and the document is divided into multiple parts, each part expressed in different languages, the system comprises: configuring means 504 configured to configure, for each one of the at least two video output ports, a language of a partial document to be outputted by the video output port; and output means 505 configured to make each one of the at least two video output ports to synchronously output the partial document to which the language configured for the video output port corresponds.

In an implementation, the system further comprises: receiving means 501 configured to receive a request for outputting the document at each one of the at least two video output ports; and detecting means 502 configured to detect each one of the at least two video output ports included in the computer.

In another implementation, the document includes all the languages used by the document, and the system further comprises: language obtaining means configured to obtain all the languages used by the document.

In still another implementation, the multiple parts of the document are organized in one of the following manners: the multiple parts of the document are stored in different files respectively; and the multiple parts of the document are stored in the same one file.

In yet another implementation, the output means comprises (not shown in FIG. 5): unit output receiving means configured to receive a request for outputting, at each one of the at least two video output ports, a unit document in a partial document to which the language configured for the video output port corresponds; language determining means configured to determine the language configured for each one of the at least two video output ports; unit language contents obtaining means configured to obtain the contents of a unit document in a partial document to which the language configured for each one of the at least two video output ports corresponds; and unit outputting means configured to send the contents of the unit document to the each one of the at least two video output ports for outputting.

In still another implementation, the output means comprises (not shown in FIG. 5): unit output receiving means configured to receive a request for outputting, at each one of the at least two video output ports, a unit document in a partial document to which the language configured for the video output port corresponds; unit contents obtaining means configured to obtain the contents of a unit document to which all the languages correspond in a partial document; language determining means configured to determine the language configured for each one of the at least two video output ports; and unit language contents output means configured to send the contents to which the language configured for each one of the at least two video output ports corresponds, in the contents of the unit document to which all the languages correspond in the partial document, to the each one of the at least two video output ports for outputting.

In still another implementation, the output means comprises (not shown in FIG. 5): recording means configured to record the languages of partial documents configured for the video output ports.

In still another implementation, the output means comprises (not shown in FIG. 5): unit output receiving means configured to receive a request for outputting, at each one of the at least two video output ports, a unit document in the partial document to which the language configured for the video output port corresponds; unit contents obtaining means configured to obtain the contents of the unit document to which all the languages correspond in the partial document; unit output means configured to send the contents of the unit document to which all the languages correspond to each one of the at least two video output ports; and language contents obtaining means configured to, according to the recorded language of the partial document configured for the video output port, obtaining and outputting the contents of a unit document to which the language configured for each one of the at least two video output ports corresponds from the contents of the unit document to which all the languages correspond.

In still another implementation, the output means comprises (not shown in FIG. 5): unit output receiving means, configured to receive a request for outputting, at each one of the at least two video output ports, a unit document in the partial document to which the language configured for the video output port corresponds; unit contents obtaining means configured to obtain the contents of a unit document to which all the languages correspond in a partial document; unit output means configured to transmit the contents of the unit document to which all the languages correspond to each one of the at least two video output ports, wherein during the transmission, the transmitted data is divided into multiple data units, each specific data unit comprising contents of a unit document to which a specific language corresponds in the partial document; and language contents obtaining means configured to, according to the recorded language of the partial document configured for the video output port, receive and output the specific data unit.

In the above system, the computer is a standalone computer or a computer network.

One or more embodiments of the present invention can take the form of a hardware embodiment, a software embodiment or an embodiment containing both hardware and software elements. For example, an embodiment can be implemented in software, including but not limited to firmware, resident software, micro code etc.

Furthermore, one or more embodiments of the present invention may take the form of a computer program product accessible from a computer-usable or computer-readable medium providing program code for use by or in connection with a computer or any instruction execution system. For the purpose of description, the computer-usable or computer-readable medium can be any tangible device that can contain, store, communicate, propagate or transport the program for use by or in connection with the instruction execution system, apparatus or device.

The medium may be electronic, magnetic, optical, or a semiconductor system (or apparatus or device) or transmission medium. Examples of a computer-readable medium include, but are not limited to, a semiconductor or solid state memory, a magnetic tape, a removable computer diskette, a random access memory (RAM), a read-only memory (ROM), a rigid magnetic disk, and an optical disk. Current examples of optical disks include compact-read only memory (CD-ROM), compact disk-read/write (CD-R/W) and DVD.

The data processing system adapted to store and/or execute program code will include at least one processor coupled to a memory element directly or indirectly via a system bus. The memory element may include a local memory which is used during the actual execution of the program code, a mass storage and a cache providing temporal storage for at least part of program code so as to reduce the number of times of retrieving code from the mass storage.

I/O devices (including but not limited to keyboards, displays, pointing devices, etc.) may be coupled to the system either directly or indirectly through intermediate controllers.

Network adapters may also be coupled to the system to enable the data processing system to be connected to other data processing systems or remote printers or storage devices through intermediate private or public networks. Modems, cable modems and Ethernet cards are just a few examples of currently available types of network adapters.

It should be appreciated from the above description that various modifications and changes may be made to the embodiments of the present invention without departing from the true spirit of the present invention. The description herein is only for illustration, and should not be construed as limitation. The scope of the embodiments of the present invention is only limited by the appended claims.

What is claimed is:

1. A computer-implemented method of presenting a document using a computer having a plurality of video ports including a first video output port and a second video output port, comprising:
   receiving a request to output the document to the first video output port and the second video output port;
   determining, in response to the request, that the first video output port is configured for a first language and the second video output port is configured to a second language;
   receiving, by the computer and responsive to the determining, a single completely-structuralized file that includes a structuralized first portion within the first language and a structuralized second portion within the second language;
   sending, to each of the first video output port and the second video output port, the single completely-structuralized file; and
   synchronously outputting, by the first and the second video output ports, respective representations of the structuralized first portion and the structuralized second portion of the single completely-structuralized file, wherein
   the document is contained within the single completely-structuralized file.

2. The method of claim 1, wherein
the single completely-structuralized file is an XML file.

3. The method of claim 1, wherein
output from each of the first and second video output ports includes animation operations that are synchronized with one another.

4. The method of claim 1, wherein
output from each of the first and second video output ports includes a plurality of separately displayed pages;
a change from a first page to a second page output from the first video output port is synchronized with a change from a first page to a second page output from the second video output port.

5. The method of claim 1, wherein
the language of the portion of the single completely-structuralized file associated with the video output port is recorded during communication with each of the first and second video output ports.

6. A computer hardware system for presenting a document, comprising:
- a computer having a plurality of video ports including a first video output port and a second video output port; and
- a hardware processor configured to initiate the following executable operations:
  - receiving a request to output the document to the first video output port and the second video output port;
  - determining, in response to the request, that the first video output port is configured for a first language and the second video output port is configured to a second language;
  - receiving, by the computer and responsive to the determining, a single completely-structuralized file that includes a structuralized first portion within the first language and a structuralized second portion within the second language;
  - sending, to each of the first video output port and the second video output port, the single completely-structuralized file; and
  - synchronously outputting, by the first and the second video output ports, respective representations of the structuralized first portion and the structuralized second portion of the single completely-structuralized file, wherein the document is contained within the single completely-structuralized file.

7. The system of claim 6, wherein
the single completely-structuralized file is an XML file.

8. The system of claim 6, wherein
output from each of the first and second video output ports includes animation operations that are synchronized with one another.

9. The system of claim 6, wherein
output from each of the first and second video output ports includes a plurality of separately displayed pages;
a change from a first page to a second page output from the first video output port is synchronized with a change from a first page to a second page output from the second video output port.

10. The system of claim 6, wherein
the language of the portion of the single completely-structuralized file associated with the video output port is recorded during communication with each of the first and second video output ports.

11. A computer program product, comprising:
a hardware storage device having stored thereon program code for presenting a document using a computer having a plurality of video ports including a first video output port and a second video output port,
the program code, which when executed by the computer, causes the computer to perform:
  - receiving a request to output the document to the first video output port and the second video output port;
  - determining, in response to the request, that the first video output port is configured for a first language and the second video output port is configured to a second language;
  - receiving, by the computer and responsive to the determining, a single completely-structuralized file that includes a structuralized first portion within the first language and a structuralized second portion within the second language;
  - sending, to each of the first video output port and the second video output port, the single completely-structuralized file; and synchronously outputting, by the first and the second video output ports, respective representations of the structuralized first portion and the structuralized second portion of the single completely-structuralized file, wherein the document is contained within the single completely-structuralized file.

12. The computer program product of claim 11, wherein
the single completely-structuralized file is an XML file.

13. The computer program product of claim 11, wherein
output from each of the first and second video output ports includes animation operations that are synchronized with one another.

14. The computer program product of claim 11, wherein
output from each of the first and second video output ports includes a plurality of separately displayed pages;
a change from a first page to a second page output from the first video output port is synchronized with a change from a first page to a second page output from the second video output port.

15. The computer program product of claim 11, wherein
the language of the portion of the single completely-structuralized file associated with the video output port is recorded during communication with each of the first and second video output ports.

* * * * *